United States Patent
Shevenell

(10) Patent No.: US 8,307,050 B2
(45) Date of Patent: Nov. 6, 2012

(54) SYSTEM AND METHOD FOR INTELLIGENT SERVICE ASSURANCE IN NETWORK MANAGEMENT

(75) Inventor: Michael P. Shevenell, Dover, NH (US)

(73) Assignee: CA, Inc., Islandia, NY (US)

(*) Notice: Subject to any disclaimer, the term of this patent is extended or adjusted under 35 U.S.C. 154(b) by 260 days.

(21) Appl. No.: 12/718,646

(22) Filed: Mar. 5, 2010

(65) Prior Publication Data

US 2011/0219111 A1    Sep. 8, 2011

(51) Int. Cl.
*G06F 15/16* (2006.01)
(52) U.S. Cl. .......................... 709/219; 709/203; 709/224
(58) Field of Classification Search .................. 709/203, 709/217, 224
See application file for complete search history.

(56) References Cited

U.S. PATENT DOCUMENTS

| | | | | |
|---|---|---|---|---|
| 6,571,285 | B1 * | 5/2003 | Groath et al. | 709/223 |
| 7,835,293 | B2 * | 11/2010 | Cidon et al. | 709/224 |
| 2007/0076616 | A1 * | 4/2007 | Ngo et al. | 370/241 |
| 2008/0316914 | A1 * | 12/2008 | Vercellone et al. | 370/216 |

* cited by examiner

*Primary Examiner* — Phuoc Nguyen
(74) *Attorney, Agent, or Firm* — Pillsbury Winthrop Shaw Pittman LLP

(57) ABSTRACT

Systems and methods for intelligent service assurance testing provided herein include receiving network infrastructure information relating to a network, receiving one or more service assurance testing parameters, determining a test schedule of one or more service assurance tests for service assurance testing of the network, the test schedule being based at least in part on the network infrastructure information and the one or more service assurance testing parameters, and deploying the one or more service assurance tests on one or more devices of the network according to the test schedule.

43 Claims, 2 Drawing Sheets

SYSTEM AND METHOD FOR INTELLIGENT SERVICE ASSURANCE IN NETWORK MANAGEMENT

FIELD OF THE INVENTION

The invention relates to intelligent provisioning and deployment of service assurance testing in computing networks using network infrastructure information.

BACKGROUND OF THE INVENTION

Service assurance techniques have a significant role in the management of large Enterprise and Service Provider Networks. There are a number of standard as well as vendor proprietary techniques to choose from to accomplish tasks like connectivity testing, response time analysis, path monitoring, etc. One problem is that testing is relatively difficult and resource intensive to deploy and can cause scalability problems if tests are not designed correctly. One example of this is connectivity testing between sites in an enterprise network. Testing with even a relatively modest number of sites (like 100) can create almost 10,000 tests in a single poll cycle when a full mesh test architecture is used. One of the challenges of this situation is that most tests are created by hand—one at a time. Although network management systems may automate some aspect of test creation and analysis, there is still a significant scaling problem.

Many tests are, deployed either one at a time or "en masse," with neither approach providing optimal coverage. The process of creating one test at a time may never yield appropriate coverage, while bulk creation may waste resources by provisioning tests indiscriminately.

Another concern in deploying service assurance testing is the possibility of test scale impacting network operations and performance negatively. Other difficulties may also exist.

Thus, provisioning and deployment of optimal testing that provides appropriate coverage for the environment, the equipment, performance goals and/or assurance level required by the enterprise or user is desirable.

SUMMARY

The invention provides systems and methods for providing service assurance testing of a computing network (e.g., an enterprise network, a service provider network, and/or other computer network). Current network management solutions (e.g., Spectrum® Infrastructure Manager offered by CA, Inc., eHealth® performance manager offered by CA, Inc., or other applications) may enable a user to configure and deploy service assurance tests. However, this process typically involves one or more manual steps and does not enable robust information regarding the network to inform testing design and deployment. The systems and methods of the invention bring much more information to testing provisioning and deployment and relieve users of steps in making, configuring, and deploying each test.

A system for service assurance may include a network management component executing a network management application. The network management application may be or include a computer application (or plurality of applications capable of communicating with one another) having one or more modules thereon.

The one or more modules may include instructions for receiving network infrastructure information relating to the network, receiving one or more service assurance testing parameters, determining a test schedule of one or more service assurance tests for service assurance testing of the network, deploying the one or more service assurance tests on one or more devices of the computer network according to the test schedule, receiving results of the one or more service assurance tests, generating one or more reports using the received results, and/or to perform other features or functions.

In some implementations, network infrastructure information may include information relating to network topology, information regarding network traffic patterns, network traffic class information, application deployment information, service deployment information, networking technology information, and/or other information.

In some implementations, the invention provides a method for improved service assurance testing. In some implementations, the invention may include a tangible computer readable storage media having computer or processor-executable instructions thereon, that when executed by one or more processing devices, may configure the one or more processing devices to perform one or more of the features and functions described herein.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
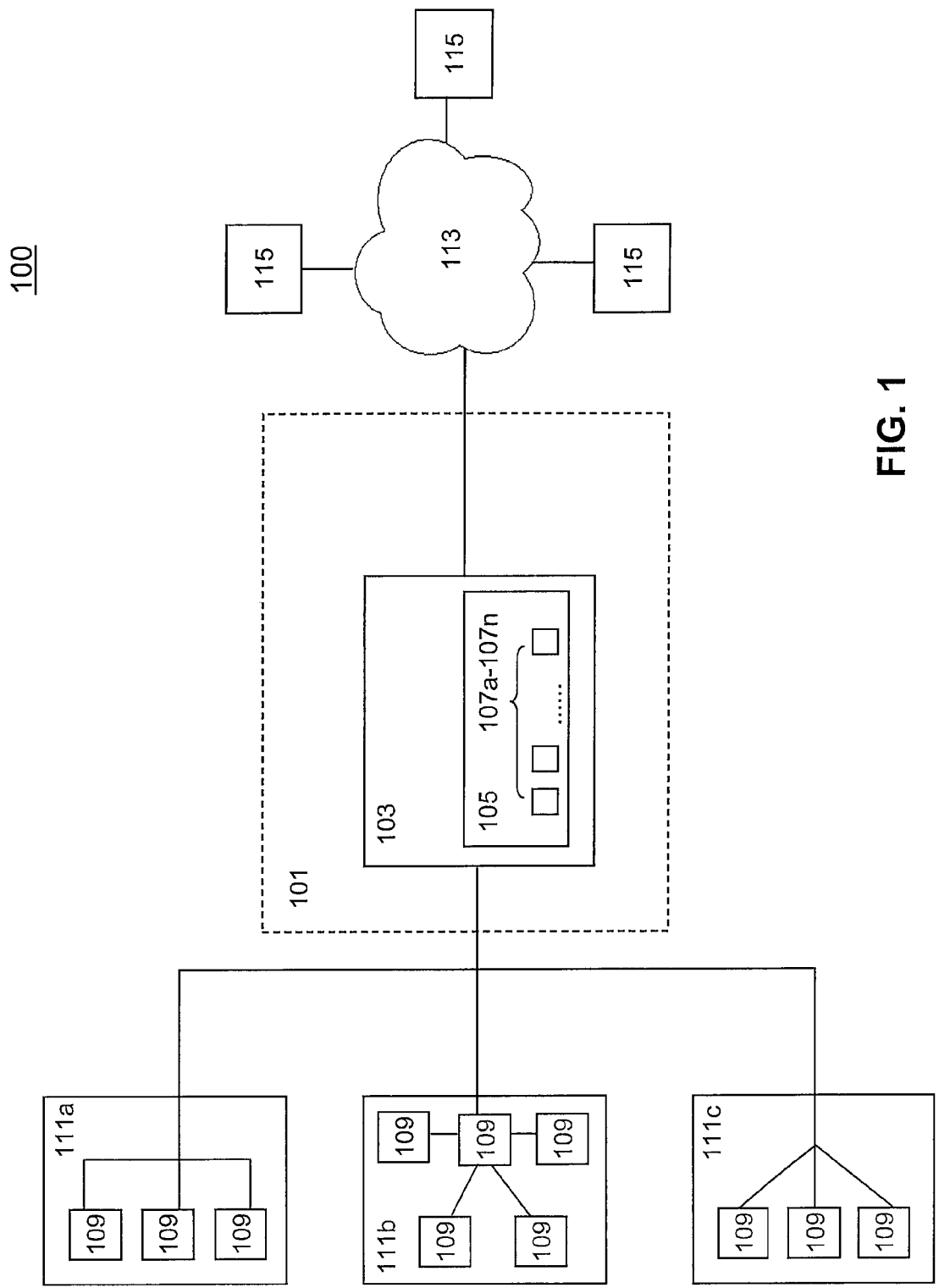
FIG. 1 illustrates an example of an environment that includes a system for performing service assurance testing, according to various implementations of the invention.

The invention provides systems and methods for providing service assurance testing of a computing network. FIG. 1 illustrates an environment 100, which is an example of an environment in which a system for providing service assurance testing for a network resides. Environment 100 may include system 101, which is an example of a system for providing service assurance testing for a network. System 101 may include a network management component 103, which may run or operate a network management application 105. Network management component 103 may be or include one or more servers or other computing devices having one or more processors that are configurable by computer readable/executable instructions for performing one or more features and functions, including those disclosed herein. Network management application 105 may be or include a computer application (or plurality of applications capable of communicating with one another) having one or more modules 107a-107n or computer executable instructions thereon that configure the one or more processors of network management component 103 to perform one or more of the service assurance testing features and functions described herein, and/or other functions.

In some implementations, modules 107a-107n may include computer executable instructions embodied on computer readable storage media such as, for example, one or more disks, tapes, non-volatile memory, hard disks, or other computer readable storage media (e.g., magnetic media, digital media, or other media). In some implementations modules 107a-107n may be implemented across multiple applications and/or devices within environment 100 to perform the service assurance testing features and functions herein and/or other features and functions.

In some implementations, modules 107a-107n may include instructions causing the one or more processors of network management application 103 to receive network infrastructure information relating to the network, receive one or more service assurance testing parameters, determine a test schedule of one or more service assurance tests for service assurance testing of the network, the test schedule being based at least in part on the network infrastructure information and the one or more service assurance testing parameters, calculate cost information for a given testing schedule based on received/derived information, deploy the one or more service assurance tests on one or more devices of the computer network according to the test schedule, receive results of the one or more service assurance tests, generate one or more reports using the received results, and/or to perform other features or functions.

In some implementations, some or all of modules 107a-107n may be part of or may operate in conjunction with Spectrum® Infrastructure Manager offered by CA, Inc., which is an integrated management solution for business service management, fault isolation and root cause analysis, and network configuration management that enables enterprises, government agencies and service providers to avoid the cost and risk of service delivery failure. In some implementations, network management application 105 may be, may be part of, or may interact with (e.g., send/receive information) the Spectrum® infrastructure manager. In some implementations, some or all of modules 107a-107n may be part of or may operate in conjunction with eHealth® performance manager offered by CA, Inc., which is a performance management solution that enables management of a diverse collection of devices from numerous vendors, isolates the source of performance degradation, minimizes recurring expenses, and provides detailed and executive level historical reporting. In some implementations, network management application 105 may be, may be part of, or may interact with (e.g., send/receive information) the eHealth® performance manager. In some implementations, modules 107a-107n and/or the features and functions thereof may be part of and/or operate in conjunction with other network management applications.

In some implementations, environment 100 may include one or more network elements 109, which may include one or more servers, desktops, laptops, workstations, wireless devices (e.g., smartphones, personal digital assistants, etc.), routers, switches, or other network devices. One or more network elements 109 may be portioned into one or more sections or portions of a network operating in environment 100. FIG. 1 illustrates network portions 111a, 111b, and 111c, which are examples of specific portions of a network having one or more network infrastructure characteristics. Network infrastructure characteristics may include any information relating to the structure or internal workings of a network.

In some implementations, a network infrastructure characteristic may include information relating to network topology. Network topology information may include information regarding how network devices are physically structured relative to one another (approaches for interconnecting network devices). For example, the particular location and configuration of routers, switches, servers, workstations and/or other network devices comprise network topology information. In some implementations, network topology information may be used to construct a map of the network or a specific portion thereof. Knowledge of network topology may be useful in service assurance testing as awareness of a given topology may enable selection and/or configuration of service assurance tests that are more useful with the given topology. Likewise, knowledge of the given topology may enable avoidance of deployment of less useful service assurance tests to networks or portions thereof having the given topology.

For example, if a given network or portion thereof is known to have a "hub-and-spoke" topology (e.g., portion 111b of FIG. 1) where traffic from all spokes must traverse a hub, full mesh testing between all the spokes (e.g., testing connectivity between all pairs of individual devices in the hub-and-spoke system) is not necessary, as only testing of connectivity of each spoke to the hub is sufficient. Other topology information may be used to make other types of service assurance testing determinations. For example, in some instances, an overlapping VPN (virtual private network) topology may be employed, wherein members/devices participate in more than one VPN. Given this information regarding a multiple VPN topology, connectivity testing between devices/members in multiple groups may be performed. In another instance, a "tunneled traffic" topology may be employed in a network, which may present service assurance testing challenges due to the need for testing of both the "inner" and "outer" traffic entities. However, knowledge of this tunneled traffic topology enables the proper testing to be done.

In some implementations, network topology may be determined using Layer 2 infrastructure, Layer 3 infrastructure, VRF tables, route analytics tools, and/or other information. As described herein, this topology information may be used more efficient or optimized tests. It should be noted that the concept of connectivity may exist at many different levels. For example, in some layered networks, entities/devices which are "connected" at one level may not actually be connected (or providing service) at the next higher level. The complex nature of multi-layered network structures gives a multi-dimensional nature to the problem of efficient service assurance testing. Each "layer" may have its own Service Assurance tools and policies. These tools must be applied appropriately to give complete coverage. As such, multiple layers should be queried as needed to determine the relevant topology in a given portion of network in which testing is desired.

In some implementations, network infrastructure characteristics may include information regarding network traffic patterns. Traffic pattern information may include information regarding how many packets (or other information) flow through a network and/or specific portions of the network, whether the packets (or other information) are flowing to or from a particular portion of a network, the source and/or destination of packets (or other information flowing through a network), descriptive characteristics of packets (or other information) flowing through the network, and/or other network traffic-related information. In some implementations, traffic pattern information may include information relating to engineered traffic flow of network communication paths. In some implementations, network traffic information may be useful in service assurance testing as awareness of traffic patterns may enable selection and/or configuration of service assurance tests that are more useful or efficient. Likewise, knowledge of traffic flow may enable avoidance of deployment of less useful service assurance tests or critical tests to given portions of a network. For example, areas with high traffic may be tested more frequently and/or intensively, whereas low traffic areas may not be scrutinized/tested as much.

In some implementations, traffic pattern or path information may be obtained from tools like Netflow/Jflow collectors and/or monitoring interface utilization (e.g., to find heavily used links).

Another example includes an enterprise network where many sites communicate back to a corporate headquarters (but not necessarily site to site). While this is similar in concept to a spoke and hub environment, it is potentially more difficult to actually recognize. In this example, traffic information may be used to identify traffic patterns indicating "corporate hubs" that may host enterprise-wide services (e.g., databases, Internet access, email filtering, call management, etc.) Thus, service assurance tests may be focused on these corporate hubs, rather than on other, less-crucial areas. Other types of network infrastructure information (e.g., traffic class, service-awareness, application deployment awareness), may be used to identify these types of hubs, but the above-described traffic information may provide a less knowledge intensive way to make such identifications, may provide initial information as to "where to look," and/or may be used in conjunction with other infrastructure information to identify these types of hubs. Similarly, in some implementations, it should be understood that any one of the types of infrastructure information described herein (or other infrastructure information) may be used in conjunction with or in place of other types of infrastructure information for the purposes of designing and/or implementing intelligent service assurance testing.

In some implementations, network infrastructure characteristics may include network traffic class information. Network traffic class information may include information relating to any classification of units of network traffic. For example, packets travelling across a network may be classified based on priority (e.g., from high to low priority). Priority classification may include quality of service (QOS)/class of service (COS) determinations and may ultimately be tied to the functions and services that a given portion of network supports. Traffic class information may be used to provide more effective/efficient/optimized testing of a network or portions thereof. For example, a portion of a network carrying packets classified as high priority because they relate to a service guaranteed at a high QOS (e.g., voice over IP [VoIP] services) may receive additional and/or expedited testing, as failure these portions of a network would be costly and/or extremely disruptive. In addition, it may be necessary/desirable to perform testing at the traffic class the service is actually being delivered on. For example, it would not make sense to test at high QoS levels if no active service was deployed at this level in an area of the network. Additionally, testing a portion of a network on which high QoS packets travel may carry a higher "cost" than testing elsewhere, as the testing may disrupt service. Thus, testing on this high QoS area may be provisioned more judiciously than testing elsewhere.

In some implementations, network infrastructure characteristics may include application deployment information. Application deployment information may include information relating to software installed/running on certain portions of a network. This software deployment information may be used to provide more effective/efficient/optimized testing of a network or portions thereof. For example, knowledge of the devices on which critical software is installed may be used to provide more intensive testing on the portions of the network that include these devices. Furthermore, knowledge of what software is deployed where may assist in specifically tailoring testing for portions of network having specific software deployed thereon.

In some implementations, network infrastructure characteristics include service deployment information. Service deployment information may include information relating to services supported on a given network. Services may be supported by one or more devices within the network and may be accessible by and/or exchange data with numerous other devices within the network and outside of the network. Service deployment information may be used to provide "environment aware" or "service aware" testing. Service aware testing includes testing wherein the tests that are generated depend on the services discovered in the network. For example, in networks carrying services involving voice or video traffic, tests unique to these services are provisioned. These tests are deployed only in portions of the network carrying voice or video traffic. This approach eases the burden on creation and deployment tests in the network and improves useful capacity by focusing tests where they are needed most.

In some implementations, network topology information, traffic pattern information, traffic class information, application deployment information, service deployment information, and/or other information may be referred to as "detailed topology information," which may be used as network infrastructure characteristics as discussed herein. In some implementations, traffic pattern/path information and traffic class information may be referred to as information relating to traffic within the network or "network traffic information."

In some implementations a map or "topological map" of a network or one or more portions thereof may be constructed. In some implementations the map may include information relating to the physical topology/configuration of the network (or portion), traffic pattern information, traffic class information, application deployment information, service deployment information, networking technology information (described below), and/or other information. The map may illustrate where, and/or on what devices/portions within the network, certain traffic patterns/volumes occur, certain traffic classes travel, certain applications or services are deployed, certain networking technologies exist, and/or other information. The constructed map and/or any portion of the information shown therein may be used to implement improved/intelligent service assurance testing.

In some implementations, network infrastructure characteristics may include networking technology information. Networking technology information may include information relating to one or more of signaling technologies used in a given portion of a network, a propagation medium used in a given portion of a network, standards used in a given portion of a network, protocol used in a given portion of a network and/or other information relating to how information/data is propagated through a given portion of the network. Networking technologies in a network or a given portion of a network may determine what kinds of tests are deployed. Nearly every technology has its own set of connectivity and fault management tools. For example, multi-protocol label switching (MPLS) technology utilizes MPLS Ping & Trace, while L3 MPLS VPNs utilize VRF Ping & Trace. In pure ethernet networks IEEE 802.1ag provides Connectivity Fault Management (CFM) and 803.3ah provides Ethernet Link OAM (operations administration and management). In pure internet protocol (IP) networks, tests such as "ping" and "traceroute" may be deployed between key endpoints in the network.

In some implementations, certain network infrastructure characteristics may apply to only certain defined portions of a given network. For example, as illustrated in FIG. 1, one or more of network portions 111a, 111b, and/or 111c may have different network structures, may have different traffic patterns, may carry traffic having different classifications, may have different applications installed thereon, may support different services, and/or may utilize different networking technologies. In some instances, some or all network infrastructure characteristics may be applicable across various portions of or even an entire network.

In some implementations environment 100 may be or include the network being managed. In some implementations environment 100 may include numerous networks or portions thereof and/or may also include a publically accessible network 113 such as, for example, the Internet and one or more devices 115 accessible over network 113.

Figure 2:
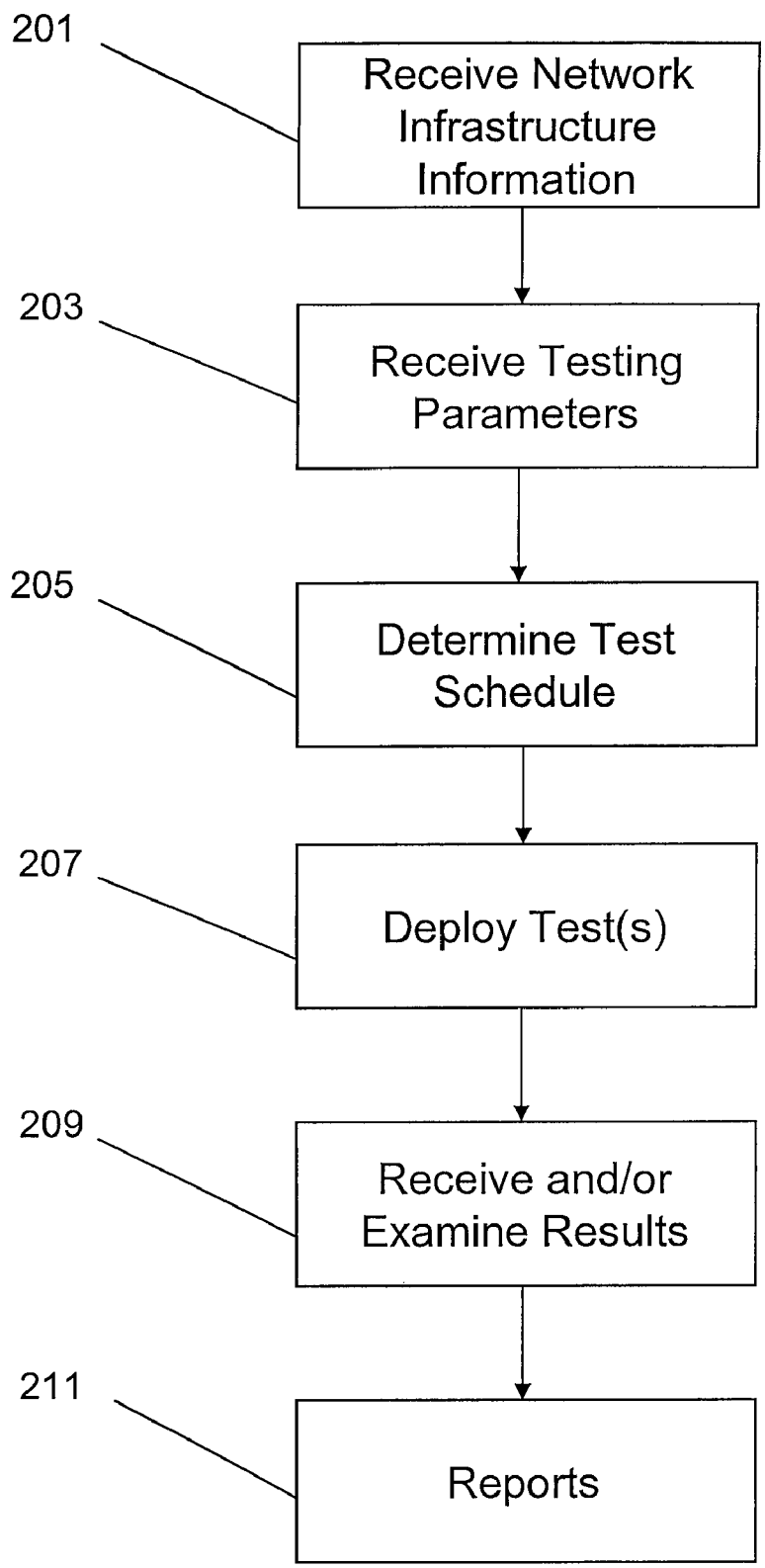
FIG. 2 illustrates an example of a process for performing service assurance testing, according to various implementations of the invention.

In some implementations, the invention provides a method for improved/intelligent service assurance testing. FIG. 2 illustrates a process 200, which is an example of a process for providing improved/intelligent service assurance testing. In some implementations, process 200 may be performed by one or more processors configured by computer executable instructions for performing a plurality of operations (e.g., the operations of process 200).

Process 200 includes an operation 201, wherein network infrastructure information (e.g., information relating to network infrastructure characteristics) relating to a network is received. As discussed above, network infrastructure information/characteristics may include network structure information, traffic pattern/path information, traffic class information, application deployment information, service deployment information network topology information, networking technology information, and/or other information.

In an operation 203, one or more service assurance testing parameters may be received. Testing parameters may include information relating to testing of the network such as, for example, a desired portion of the network to be tested, desired frequency or timetable of testing, desired type of tests or testing (e.g., connectivity testing, performance testing, etc.), and/or other testing related information. Test scheduling and frequency are important parameters in the Fault Management value of Service Assurance Tests. While more frequent testing provides the ability to identify faults more quickly, it significantly impacts the resources required to perform testing. In some implementations, an optimal configuration of tests should consider the "costs" of executing the tests. As used herein, the term cost includes any burden imposed on the network or a portion thereof (i.e., "resource costs" such as, for example, CPU and/or memory utilization, network bandwidth utilization, etc.) or expenditure that must be made (including, but not limited to financial expenditures and/or equivalent representations thereof) as a result of performing a given test (e.g., to maintain a given QoS for a service that is disrupted by a test, an enterprise may expend certain man-hours, physical inventory, and/or monies). The costs to the Network Management System, device and service under test as well as the network make certain levels of testing cost prohibitive. As such, in some aspects, the invention described herein identifies critical areas where enhanced testing is both beneficial and warranted.

In some implementations, the network infrastructure information and/or testing parameters may be received by a network management application (e.g., application 105) and/or one or more modules thereof (e.g., modules 107a-107n). In an operation 205, the management application or modules may determine a test schedule of one or more service assurance tests for service assurance testing of the network. The test schedule may be based, at least in part, on the network infrastructure information and the one or more service assurance testing parameters. As discussed herein, provisioning tests may have a net cost to certain devices, services, and/or the network as a whole. As such, in some implementations, determination of the testing schedule may include a determination of these costs and a decision as to what tests to deploy, where they are to be deployed, when to deploy the tests, whether to deploy the tests at all, etc. In some implementations, cost information may be input as a service assurance test parameter. Information used to determine "costs" of testing may be derived from network infrastructure characteristics/information, received testing parameters, and/or other information (e.g., a lookup table, matrix, or other correlation engine that utilizes factual information gathered about the network infrastructure and applies the received testing parameters to provide a prediction, estimate, or determination of a cost metric). This cost information (which may be qualitative or quantitative) may then be used to either provision the tests (i.e., determine the schedule) according to the received testing parameters (i.e., if the received parameters do not pose a problem re: cost to the network), to provision the tests according to modified parameters (i.e., modified by the network management application or its modules to optimally reduce the costs to the network), and/or to suggest testing parameters (or multiple options therefore) for approval or selection by a user/administrator. Determinations re: formulating a testing schedule in light of cost information may, in some implementations, essentially be a cost-benefit analysis or cost-necessity analysis. Other schemes may be implemented regarding how cost information is used in determining testing schedules.

In an operation 207, one or more service assurance tests may be deployed by the network management application or its constituent modules on one or more devices of the computer network according to the determined test schedule.

In an operation 209, the management application and/or modules may receive results of the deployed tests. These results may include whether or not a given network device is responsive or in communication with a given portion of the network (e.g., connectivity testing) and/or any metrics received as a result of performance or connectivity testing (e.g., response time, computation time, etc.). The received results may then be examined to make calculations and/or draw conclusions from these results. For example, if certain devices are determined to not be in communication with a given portion of the network, an alarm may be triggered notifying an administrator or other entity of the need for a repair or a workaround. In another example, if a given process supported by the network is determined to be performing at an unacceptable rate (e.g., as determined by one or more performance tests), remediative measures may be prescribed to increate the performance rate.

In an operation 211, one or more reports may be generated using the received testing results and/or any conclusions/determinations derived therefrom. In some implementations, the report may be sent to one or more recipients (e.g., administrators, managers, etc.) electronically or otherwise communicated to recipients. In some implementations, any actions deemed necessary or advisable from the results may be performed to assure desired service/performance from the network.

In some implementations, the invention may include a tangible computer readable storage media having computer or processor-executable instructions thereon that, when executed by one or more processing devices, may configure the one or more processing devices to perform one or more of the features and functions described herein.

Those of ordinary skill in the art will appreciate that the systems described herein are examples and that the system of the invention may include more or less of the described components/elements and that the features and functions described herein may be performed by components different from those described herein. In some implementations the functions of certain components and/or may be combined. Those of ordinary skill in the art will also appreciate that the methods/processes described herein are examples and that method/processes according to the invention may have more or fewer operations than described above, that the operations may be performed in a different order than described above, and/or that some features and/functions may be combined.

The term "portion" or "network portion," or "portion of a network" as used herein may refer to a single device, a portion of a device (virtual device or partition), an application or group thereof, a plurality of network devices (including those grouped logically, physically, and/or geographically), a service or group thereof provided by one or more devices, a subnet, or other physical or logical division of a network.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for service assurance testing of a computer network, comprising:
   one or more processors configured to:
      receive network infrastructure information relating to the network,
      receive one or more service assurance testing parameters,
      determine a test schedule of one or more service assurance tests for service assurance testing of the network, the test schedule being based at least in part on the network infrastructure information, and the one or more service assurance testing parameters, and
      deploy the one or more service assurance tests on one or more devices of the network according to the test schedule.

2. The system of claim 1, wherein the network infrastructure information comprises information relating to the physical topology of the network, and wherein at least one of the one or more service assurance tests are devised based at least in part on a specific physical topology indicated in the network infrastructure information.

3. The system of claim 2, wherein the at least one of the one or more service assurance tests that are devised based at least in part on the specific physical topology indicated in the network infrastructure information are further based upon a query to at least one layer of the network to determine the specific topology in a portion of the network to which the one or more service assurance tests are to be deployed.

4. The system of claim 2, wherein the specific physical topology is a hub and spoke topology, such that the one or more service assurance tests are deployed on only one spoke of the hub and spoke topology to obtain test data therefrom.

5. The system of claim 1, wherein the network infrastructure information comprises traffic pattern data relating to traffic patterns within the network, and wherein at least one of the one or more service assurance tests are devised based at least on part on one or more specific traffic patterns from the traffic pattern data.

6. The system of claim 5, wherein the traffic pattern data comprises at least data regarding data volume within one or more specific portions of the network.

7. The system of claim 6, wherein the at least one of the one or more service assurance tests are devised to be deployed to at least one specific portion of the network servicing a high volume of data.

8. The system of claim 1, wherein the network infrastructure information comprises traffic class information relating to classification of traffic within the network, and wherein at least one of the one or more service assurance tests are devised based at least in part on a classification of traffic flowing to or from one or more specific portions of the network.

9. The system of claim 8, wherein the classification of traffic is one of a plurality of classifications relating to traffic priority.

10. The system of claim 9, wherein the at least one of the one or more service assurance tests are directed to at least one of the one or more specific portions of the network comprising traffic classified as high priority flowing thereto or therefrom.

11. The system of claim 10, wherein the one or more processors is configured to avoid a deployment of at least one of the one or more service assurance tests that is determined to be less useful than remaining one or more service assurance tests with respect to a volume based upon a topology of the network, such that the at least one less useful service assurance test is configured to test at least one device in the network that is less critical than other remaining devices in the network.

12. The system of claim 1, wherein the network infrastructure information comprises network technology information relating to one or more network technologies used at specific portions of the network, and wherein at least one of the one or more service assurance tests are devised based at least in part on a network technology of a specific portions of the network from the network technology information.

13. The system of claim 12, wherein the one or more network technologies comprise one or more of:
   signaling technologies,
   propagation media,
   network standards, or
   network protocols.

14. The system of claim 1, wherein the one or more service assurance testing parameters comprise one or more of:
   an indication of one or more specific portions of the network to be tested using the one or more service assurance tests,
   at least one test type, or
   a timing parameter deployment of the one or more service assurance tests.

15. The system of claim 1, wherein the one or more service assurance tests comprise one or more of connectivity testing or performance testing.

16. The system of claim 1, wherein the one or more processors configured to:
   determine a test schedule of one or more service assurance tests further comprises one or more processors configured to:
      determine a cost of the one or more service assurance tests according to the one or more received service assurance testing parameters; and determine whether the cost is acceptable according to a predetermined standard.

17. The system of claim 16, wherein one or more processors configured to determine whether the cost is acceptable according to a predetermined standard further comprise one or more processors configured to determine a test schedule of one or more service assurance tests according to altered service assurance testing parameters when it is determined that the cost is unacceptable.

18. The system of claim 1, wherein the one or more processors are further configured to receive results of the one or more service assurance tests.

19. The system of claim 18, wherein the one or more processors are further configured to generate one or more reports using the received results.

20. The system of claim 1, wherein the network infrastructure information comprises application deployment information relating to a portion of the network on which a critical software component is installed, wherein increased service assurance tests are deployed to a portion of the network on which the critical software component is installed.

21. The system of claim 1, wherein the network infrastructure information comprises service deployment information relating to a device of the network supporting a specific service, wherein the one or more service assurance tests are customized based on the specific service, and wherein the one or more service assurance tests are deployed only to the device of the network supporting the specific service.

22. A method for service assurance testing of a computer network, the method being executed by one or more processors configured to perform a plurality of operations comprising:
   receiving network infrastructure information relating to the network;
   receiving one or more service assurance testing parameters;
   determining a test schedule of one or more service assurance tests for service assurance testing of the network, the test schedule being based at least in part on the network infrastructure information and the one or more service assurance testing parameters; and
   deploying the one or more service assurance tests on one or more devices of the network according to the test schedule.

23. The method of claim 22, wherein the network infrastructure information comprises information relating to the physical structure of the network, and wherein at least one of the one or more service assurance tests are devised based at least in part on a specific physical structure indicated in the network infrastructure information.

24. The method of claim 23, wherein the one or more service assurance tests are carried out based upon a query to at least one layer of the network to determine the specific topology in a portion of the network to which the one or more service assurance tests are to be deployed.

25. The method of claim 23, wherein the specific physical topology is a hub and spoke topology, and the deploying is carried out on only one spoke of the hub and spoke topology to obtain test data therefrom.

26. The method of claim 22, wherein the network infrastructure information comprises traffic pattern data relating to traffic patterns within the network, and wherein at least one of the one or more service assurance tests are devised based at least on part on one or more specific traffic patterns from the traffic pattern data.

27. The method of claim 26, wherein the traffic pattern data comprises at least data regarding data volume within one or more specific portions of the network.

28. The method of claim 27, wherein the at least one of the one or more service assurance tests are devised to be deployed to at least one specific portion of the network servicing a high volume of data.

29. The method of claim 22, wherein the network infrastructure information comprises traffic class information relating to classification of traffic within the network, and wherein at least one of the one or more service assurance tests are devised based at least in part on a classification of traffic flowing to or from one or more specific portions of the network.

30. The method of claim 29, wherein the classification of traffic is one of a plurality of classifications relating to traffic priority.

31. The method of claim 30, wherein the at least one of the one or more service assurance tests are directed to at least one of the one or more specific portions of the network comprising traffic classified as high priority flowing thereto or therefrom.

32. The method of claim 31, wherein the deploying of at least one of the one or more service assurance tests is avoided when the at least one service assurance test is less useful than remaining one or more service assurance tests with respect to a volume based upon a topology of the network, such that the at least one less useful service assurance test is configured to test at least one device in the network that is less critical than other remaining devices in the network.

33. The method of claim 22, wherein the network infrastructure information comprises network technology information relating to one or more network technologies used at specific portions of the network, and wherein at least one of the one or more service assurance tests are devised based at least in part on a network technology of a specific portions of the network from the network technology information.

34. The method of claim 33, wherein the one or more network technologies comprise one or more of:
   signaling technologies,
   propagation media,
   network standards, or
   network protocols.

35. The method of claim 22, wherein the one or more service assurance testing parameters comprise one or more of:
   an indication of one or more specific portions of the network to be tested using the one or more service assurance tests,
   at least one test type, or
   a timing parameter deployment of the one or more service assurance tests.

36. The method of claim 22, wherein the one or more service assurance tests comprise one or more of connectivity testing or performance testing.

37. The method of claim 22, wherein determining a test schedule of one or more service assurance tests further comprises:
   determining a cost of the one or more service assurance tests according to the one or more received service assurance testing parameters; and
   determining whether the cost is acceptable according to a predetermined standard.

38. The method of claim 37, wherein determining whether the cost is acceptable according to a predetermined standard further comprises determining a test schedule of one or more service assurance tests according to altered service assurance testing parameters when it is determined that the cost is unacceptable.

39. The method of claim 22, wherein the operations further comprise receiving results of the one or more service assurance tests.

40. The method of claim 39, wherein the operations further comprise generating one or more reports using the received results.

41. The method of claim 22, wherein the network infrastructure information comprises application deployment information relating to a portion of the network on which a critical software component is installed, wherein increased, service assurance tests are deployed to a portion of the network on which the critical software component is installed.

42. The method of claim 22, wherein the network infrastructure information comprises service deployment information relating to a device of the network supporting a specific service, wherein the one or more service assurance tests are customized based on the specific service, and wherein the deploying is carried out only to the device of the network supporting the specific service.

43. A system for service assurance testing of a computer network, comprising:
  one or more processors configured to:
    receive network infrastructure information relating to the network,
    create a map of at least a portion of the network, using the received network infrastructure information, wherein the map comprises:
      information relating to the physical structure of the portion of the network,
      information relating to traffic within the portion of the network, and
      information relating to one or more services supported, at least in part, by the portion of the network,
    receive one or more service assurance testing parameters,
    determine a test schedule of one or more service assurance tests for service assurance testing of the network, the test schedule being based at least in part on information included in the map and the one or more service assurance testing parameters,
    deploy the one or more service assurance tests on one or more devices of the network according to the test schedule;
    receive results from one or more of the deployed service assurance tests; and
    generate at least one report based on the received results.

* * * * *